United States Patent [19]

Bergthaller et al.

[11] Patent Number: 4,524,124
[45] Date of Patent: Jun. 18, 1985

[54] COLOR PHOTOGRAPHIC RECORDING MATERIAL CONTAINING A THIAZOLE AZO DYE RELEASER FOR CYAN DYES

[75] Inventors: Peter Bergthaller, Cologne; Rudolf Stolzenburg, Langenfeld; Paul Marx, Leverkusen; Rainer Hamprecht, Odenthal, all of Fed. Rep. of Germany

[73] Assignee: Agfa-Gevaert Aktiengesellschaft, Leverkusen, Fed. Rep. of Germany

[21] Appl. No.: 622,011

[22] Filed: Jun. 18, 1984

[30] Foreign Application Priority Data

Jun. 28, 1983 [DE] Fed. Rep. of Germany ....... 3323282

[51] Int. Cl.³ .................. G03C 5/54; G03C 1/40
[52] U.S. Cl. ....................... 430/241; 430/222; 430/223; 430/242; 430/562
[58] Field of Search .............. 430/223, 222, 226, 225, 430/562, 241, 242

[56] References Cited

U.S. PATENT DOCUMENTS 4,207,104  6/1980  Chapman et al. .............. 430/562
4,468,452  8/1984  Nakamura et al. ............. 430/223

Primary Examiner—Richard L. Schilling
Attorney, Agent, or Firm—Connolly and Hutz

[57] ABSTRACT

Monoazo dyes corresponding to the following formula

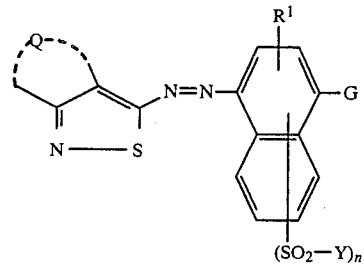

are suitable for use as light-stable cyan image dyes stable to reducing agents for the dye diffusion transfer process.

In the above formula:

Q represents the remainder of the molecule required to complete a fused benzene or thiophene ring, which contains additional electron acceptor groups, or to complete a fused pyridine, pyrimidine, pyridazine, pyrazine or thiazole ring;

G represents —OH, acyloxy;

$R^1$ represents H or one or two identical or different radicals selected from the group consisting of halogen, acyl, acylamino and —CN;

Y represents H, —OH, an amino group optionally substituted by alkyl or aryl, a cyclic amino group or a group of the formula —NH—SO$_2$—R$^2$;

$R^2$ represents alkyl, aryl, an amino group optionally substituted twice by alkyl or a cyclic amino group;

n=0, 1 or 2.

2 Claims, No Drawings

COLOR PHOTOGRAPHIC RECORDING MATERIAL CONTAINING A THIAZOLE AZO DYE RELEASER FOR CYAN DYES

This invention relates to a color photographic recording material for producing color images by the dye diffusion transfer process which contains, associated with at least one photosensitive silver halide emulsion layer, a non-diffusing dye-releaser from which a diffusible cyan dye is released during development.

The dye diffusion transfer process is based on the principle whereby an imagewise distribution of diffusible dyes is produced during development in a photosensitive element as a function of preliminary exposure and is transferred to an image-receiving element.

In the dye diffusion transfer process, it is extremely important that the dyes should be able to be adequately fixed in the image-receiving layer and that, in addition, they should show excellent spectral properties and outstanding stability to light and heat.

Cyan dyes for the dye diffusion process, which contain a phthalocyanine radical, preferably in the form of the copper complex, as chromophore are known, for example, from No. DE-A-31 01 036.

One disadvantage of the, basically, extremely stable dyes lies in their reduced diffusibility by comparison with the yellow and magenta dyes normally used. The result of this is that the build up of the dye transfer during the transfer time is accompanied by a change in color from red to neutral and requires strict adherence to the optimal transfer time.

Rapidly diffusing cyan dyes for the dye diffusion process have been described in the series of 4-(4-nitrophenylazo)-1-naphthols, for example in No. DE-A-24 06 653 and No. DE-A-28 53 584.

After they have been released from the carrier radical responsible for resistance to diffusion, the dyes mentioned in No. DE-A-24 06 653 are present in the form of an anionic chomophore, diffuse in that form into the image-receiving layer and are also fixed on the mordant in the form of the dye anion. Anionic dyes generally show poor stability to light. Accordingly, it is not surprising that the cyan anionic dyes from the 4-(4-nitrophenylazo)-naphthol series show inadequate light stability. To overcome this disadvantage, dyes from the same class showing better stability to light through an additional carbamoyl substitution in the ortho position to the OH-group have already been described in No. DE-A-28 53 584.

An improvement in light stability and also in general stability to heat and moisture, above all in a sealed layer assembly or so-called "monopack" is obtained by using monoazo dyes from the nitrophenyl azonaphthsultam series which are described as cyan dyes for dye diffusion processes in No. DE-A-28 06 196.

One feature common to all these dyes is that the presence of a nitro group in the para position to the azo group labilizes the chromophore against attack by reducing agents.

Quite apart from the developer substances, however, reducing agents are present for performing certain functions in virtually all recording materials for the dye diffusion transfer process. For example, the intermediate layers normally contain, between the individual layer packs associated with a certain component color, reducing agents, particularly those from the monoalkylated or dialkylated hydroquinone series which are capable of arresting developer oxidation products and are correspondingly reactive.

Likewise, recording materials containing reducible dye releasers contain in association therewith so-called electron donor compounds (ED-compounds) or their precursors. Information on this subject may be found in the following applications: No. EP-A-0 004 399, U.S. Pat. No. 4,139,379, U.S. Pat. No. 4,278,750, DE-A-30 14 669, No. EP-A-0 38 032, No. DE-A-30 08 588 and No. DE-A-3 006 268.

It is known that 4-nitrophenyl azo dyes are more readily attacked by reducing agents than other monoazo dyes. Even the brief contact between reducing agent and chromophore during the image forming time can be sufficient, in the presence of a strongly alkaline processing medium, to change the cyan dye into compounds of unknown structure which absorb light of shorter wavelength, so that its color is changed from cyan to blue or even violet. Accordingly, there is a need for readily diffusing cyan monoazo dyes, which do not contain a 4-nitrophenyl azo group and which, accordingly, are less sensitive to reduction, for the dye diffusion transfer process.

The object of the present invention is to provide new color-providing compounds for the dye diffusion transfer process, from which diffusing cyan dyes are released during the photographic development process and which show improved light stability, improved spectral properties and improved resistance to reducing agents.

The present invention relates to a color photographic recording material for the production of colored images by the dye diffusion transfer process which contains, associated with at least one photosensitive silver halide emulsion layer, a non-diffusing color-providing compound (dye releaser), from which a diffusible azo dye is released under the alkaline development conditions as a function of the development of the silver halide emulsion layer, characterized in that the azo dye corresponds to the following formula I

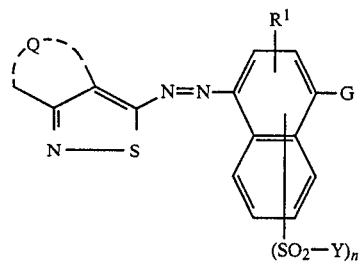

in which
Q represents the remainder of the molecule required to complete a fused benzene or thiophene ring, which contains additional electron acceptor groups, or to complete a fused pyridine, pyrimidine, pyridazine, pyrazine or thiazole ring;
G represents —OH;
$R^1$ represents H or one or two identical or different radicals, namely halogen, particularly chlorine, acyl, acylamino or —CN;
Y represents H, —OH, an amino group optionally substituted by alkyl or aryl, a cyclic amino group or a group of the formula —NH—SO$_2$—R$^2$;
$R^2$ represents alkyl, aryl, an amino group optionally substituted twice by alkyl or a cyclic amino group;
n=0, 1 or 2.

The radical G may even be present in anionic form under the alkaline development conditions. Similarly, the radical G may initially be present in acylated form as an —O-acyl group which is hydrolyzed under the alkaline development conditions.

Where a dye contains more than one radical Y (n=2), these radicals may be the same or different.

The fused benzene rings or heterocyclic rings completed by Q may be further substituted, for example by halogen, alkyl, alkoxy, alkylthio or carbocyclic or heterocyclic aromatic rings, for example phenyl, furyl or thienyl, or by substituents having an electron acceptor character, such as cyano, nitro, carboxy, carbalkoxy, carbamoyl, alkyl sulfinyl or alkyl sulfonyl. The fused benzene rings or thiophene rings in particular contain electron-accepting substituents such as these.

The alkyl groups optionally present in $R^1$ and mentioned in the definition of Y preferably contain no more than 4 C-atoms; preferred examples are methyl, ethyl, n-propyl, isopropyl, n-butyl.

The aryl groups optionally present in $R^1$ and mentioned in the definition of Y are preferably phenyl groups or naphthyl groups; they may be further substituted, for example by alkyl, alkoxy, acylamino, sulfamoyl, sulfinate, although—including substituents such as these—they preferably contain no more than 17 carbon atoms.

The cyclic amino group mentioned is a 5-membered to 7-membered cyclic amino group, for example the pyrrolidine, piperidine or morpholine group.

Acyl radicals (acylamino) are generally derived from aliphatic or aromatic carboxylic or sulfonic acids, from carbamic acids or sulfamic acids or from carbonic acid semiesters.

The dyes corresponding to formula I also contain, for example in the form of G or in the form of some of the groups already mentioned in reference to $R^1$ and Y or in the form of substituents optionally attached to one of these groups by a suitable bond, suitable functional groups for adjusting favorable diffusion and mordant behavior, for example anionic or anionizable groups, such as sulfonate, sulfinate, phenolate, naphtholate, carboxylate, disulfimide or sulfamoyl groups, and also a functional group which emanates from the splitting of a bond to a carrier radical provided with a ballast group and which is characteristic of the nature of the carrier radical and the linkage thereto. The functional group in question may be identical with one of the previously mentioned groups modifying the diffusion and mordant behavior. The functional group mentioned may be attached, for example, to an alkyl or aryl radical which, in turn, is part of one of the substituents mentioned in reference to $R^1$ and Y.

The present invention also relates to monoazo dyes corresponding to formula I.

Formula I relates to the diffusible dyes according to the invention which are released during development. They are released from corresponding, incorporated, non-diffusing color-providing compounds (dye releasers). The compounds in question are compounds in which a dye radical corresponding to formula I is attached, optionally through a suitable bond, to a carrier radical CAR containing at least one ballast group.

The dye corresponding to formula I may be attached to the carrier radical, for example, through one of the substituents $R^1$; through G or through one of the groups Y present. Accordingly, the dye releasers according to the invention may be represented by the following formula:

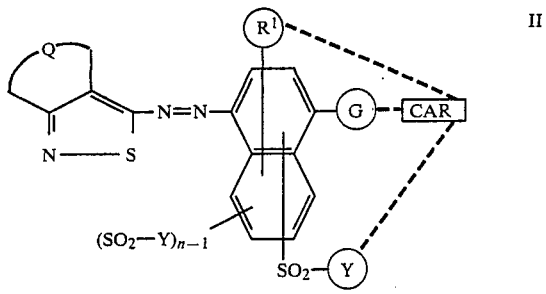

in which

Q, G, $R^1$, Y and n are as already defined,

CAR represents a carrier radical containing at least one diffusion-preventing group, and the dotted lines represent possible points of attachment. In the dye releasers of formula II according to the invention, therefore, the carrier radical is present as substituent in one of the groups represented by $R^1$, G or Y.

In addition to the diffusion preventing group, the carrier radical represented by CAR contains at least one group which is capable of being split as a function of the development of a silver halide emulsion layer, so that the dye attached to the carrier radical may be cleared from the diffusion-preventing group, optionally together with a small fragment of the original carrier radical, and may therefore be released from the anchorage in the layer. The carrier radicals may have different structures, depending on the way in which the cleavable group functions.

The dye releasers according to the invention may be, for example, non-diffusing color couplers which, in the coupling position, contain a dye radical according to the present invention and release that dye radical in consequence of chromogenic coupling. Release mechanisms such as these are described, for example, in DE-C-1 095 115 and in U.S. Pat. No. 3,227,550.

However, redox-active dye releasers corresponding to the following formula have proved to be particularly advantageous:

BALLAST-REDOX-DYE

In this formula:

BALLAST represents a ballast radical,

REDOX represents a redox-active group, i.e. a group which is oxidizable or reducible under the alkaline development conditions and which undergoes an elimination reaction, a nucleophilic displacement reaction, a hydrolysis reaction or any other cleavage reaction to a varying degree, depending on whether it is present in oxidized form or in reduced form, with the result that the radical DYE is split off, and DYE represents the radical of a diffusible dye, in the present case a dye corresponding to formula I.

Ballast radicals may be regarded as radicals which enable the dye donors according to the invention to be incorporated in non-diffusing form in the hydrophilic colloids normally used in photographic materials. Preferred ballast radicals are organic radicals which generally contain straight-chain or branched aliphatic groups generally containing from 8 to 20 carbon atoms and, optionally, also carbocyclic or heterocyclic, optionally aromatic groups. These radicals are attached to the rest of the molecule either directly or indirectly, for example through one of the following groups: —NH—CO—NHSO$_2$—, —NR— (where R is hydrogen or alkyl), —O— or —S—. In addition, the ballast radical may also contain water-solubilizing groups, such as for example sulfo groups or carboxyl groups, which may even be present in anionic form. Since the diffusion properties depend upon the size of the molecule of the compound used as a whole, it is even sufficient in certain cases, for example if the molecule used as a whole is large enough, to use shorter-chain radicals as ballast radicals.

Redox-active carrier radicals having the structure BALLAST-REDOX- and corresponding dye releasers are known in a variety of different forms.

Oxidizable dye releasers, which after oxidation undergo hydrolysis with release of a diffusible dye, are described for example in: Nos. DE-A-22 42 762, DE-A-24 06 664, DE-A-25 05 246, DE-A-26 13 005, DE-A-26 45 656 and in the following Research Disclosures: No. 15 157 (November 1976), No. 16 654 (April 1977), No. 17 736 (January 1979). The compounds in question are, for the most part, compounds in which a dye radical is attached by a sulfonamide group to an oxidizable carrier radical. Accordingly, the dye released during development contains a sulfamoyl group.

Oxidizable dye releasers, which in oxidized form undergo an intramolecular displacement reaction with release of a diffusible dye, are described, for example, in U.S. Pat. No. 3,443,940. Dyes containing sulfinate groups are released from dye releasers of this type.

The following are examples of oxidizable carrier radicals from the oxidized form of which a dye radical attached thereto is released:

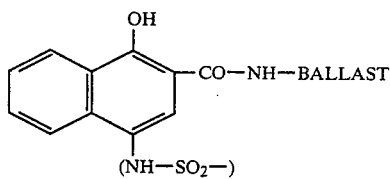

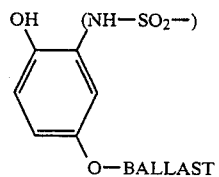

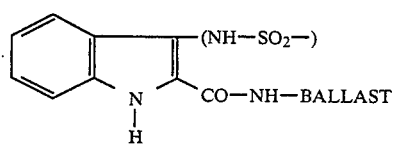

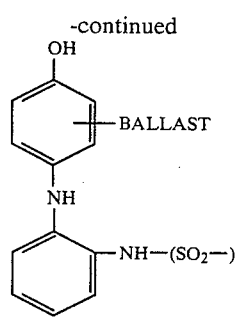

The groups in brackets are split off together with the dye radical, remaining as functional groups in the dye to which they are attached optionally by a bond.

In the dye releasers hitherto mentioned, the dye radicals are released proportionally to the rate of formation of an oxidation product by the development of silver halide or by catalytic intensification, for example with H$_2$O$_2$. Accordingly, this principle works as a negative process and, for the production of positive images, requires reversal, for example through the use of direct-positive emulsions or through the use of a layer arrangement operating on the silver salt diffusion principle.

It is particularly advantageous for the structure of the carrier radical comprising a ballast radical and a redox part to be such that the diffusible azo dye is released substantially inversely proportionally to the state of development of the silver halide layer under alkaline conditions. In this case, the system in question is one which works positively from the outset and which is suitable for the production of positive images using conventional negative silver halide emulsions. Dye releasers of this type are also known and are described in the following.

Oxidizable dye releasers which are stable in oxidized form but which, in reduced form, undergo an intramolecular nucleophilic displacement reaction with release of a dye radical are described, for example, in Nos. DE-A-24 02 900 and DE-A-25 43 902.

Oxidizable dye releasers which are stable in oxidized form, but which in reduced form release the dye in an elimination reaction are described in Nos. DE-A-28 23 159 and DE-A-28 54 946.

The way in which these two groups of dye releasers work may be reversed by using compounds of the type in question in oxidized rather than in reduced form. In this way, the dye releasers mentioned in the following are obtained.

Reducible dye releasers which, after reduction, undergo an intramolecular nucleophilic displacement reaction with release of a dye radical, are described in No. DE-A-28 09 716. These compounds are known as BEND-compounds (BEND=Ballasted Electron-accepting Nucleophilic Displacement).

Reducible dye releasers which, after reduction, undergo an elimination reaction with release of a dye are described in No. EP-A-0 004 399 and No. GB-A-80 12 242.

Other classes of reducible dye releasers which can be reductively split by similar reaction mechanisms with release of dyes are described in No. DE-A-30 08 588 and No. DE-A-30 14 669.

The following are examples of reducible carrier radicals from which a dye radical attached thereto is split off by reduction:

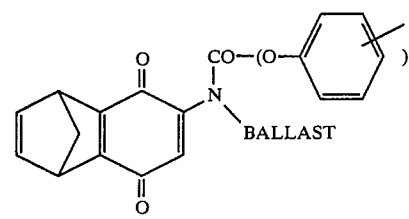

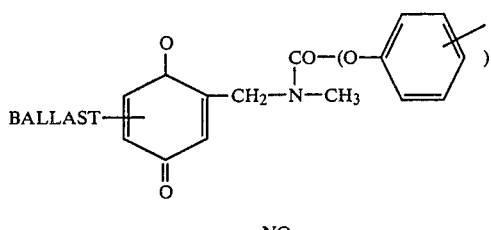

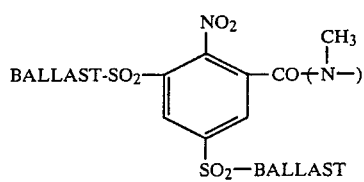

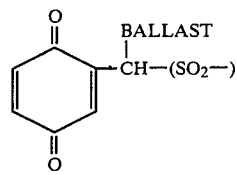

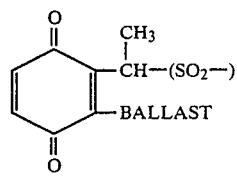

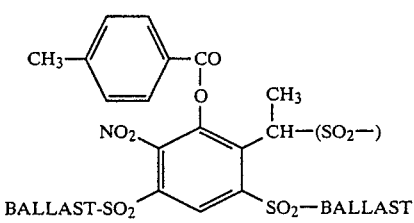

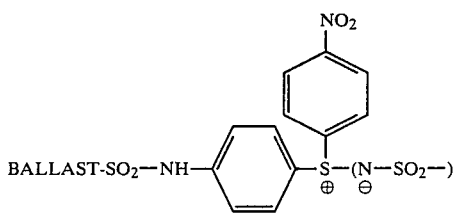

The groups in brackets are functional groups of the dye radical and are separated therewith from the remaining part of the carrier radical. The functional group may be any of the substituents which were mentioned in the definition of the radicals $R^1$, G and Y in formula I and which may have a direct bearing upon the absorption properties of the dyes of formula I according to the invention. On the other hand, however, the functional group may also be separated by an intermediate member from the chromophore of the dye according to the invention by being present as substituent in one of the groups mentioned in the definition of the $R^1$, G and Y without the absorption properties having to be influenced as a result. However, the functional group, optionally together with the intermediate member, may be of importance to the diffusion and mordant behavior of the dyes according to the invention. Suitable intermediate members are, for example, alkylene or arylene groups.

The last-mentioned classes of reducible, reductively cleavable dye releasers are best used together with so-called electron donor compounds (ED-Compounds). ED-compounds act as a reducing agent which is consumed imagewise during development of the silver halide and of which the unused part reduces the associated dye releaser and, by so doing, effects release of the dye. Suitable ED-compounds are, for example, non-diffusing or substantially non-diffusing derivatives of hydroquinone, benzisoxazolone, p-aminophenol or ascorbic acid (for example ascorbyl palmitate) of the type described, for example, in No. DE-A- 28 09 716. Particularly favorable ED-compounds are described in No. DE-A- 30 06 268.

The following are examples of suitable ED-compounds:

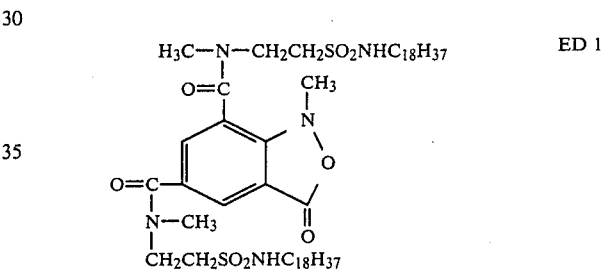

ED 1

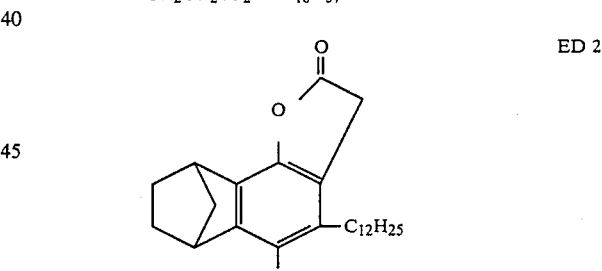

ED 2

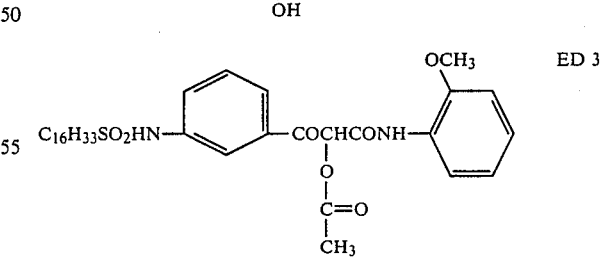

ED 3

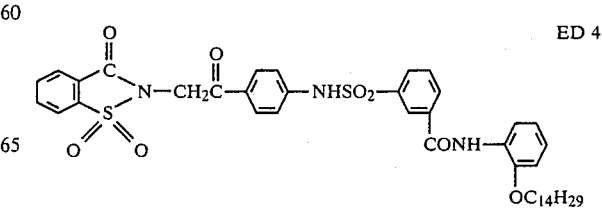

ED 4

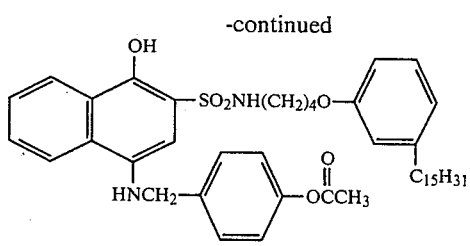

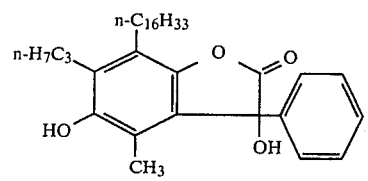

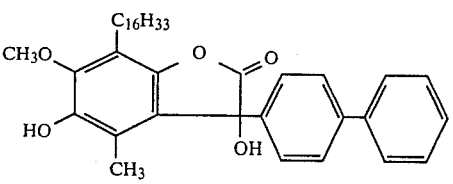 ED 5

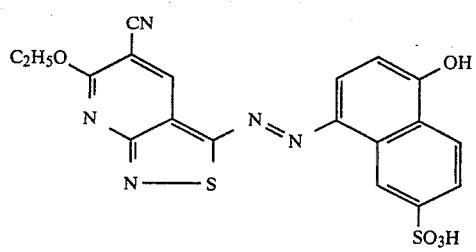 ED 6

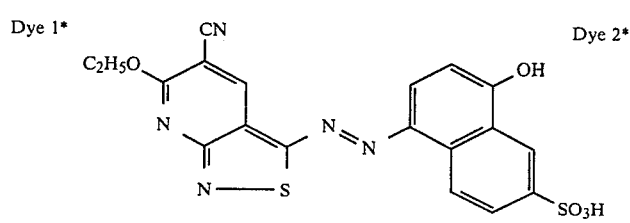 ED 7

Examples of cyan monoazo dyes of formula I according to the invention characterized by particularly favorable absorption are given in the following.

The dyes marked with an asterisk (*) are model dyes which may be preparatively converted without difficulty into dye donors of formula II according to the invention or dyes of formula I released therefrom.

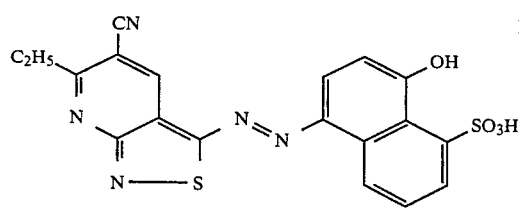 Dye 1*

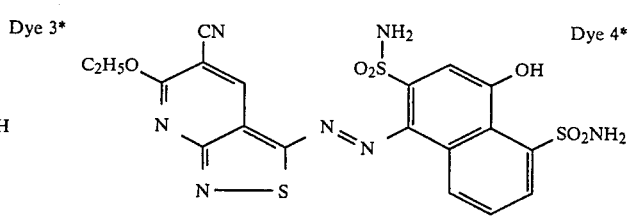 Dye 2*

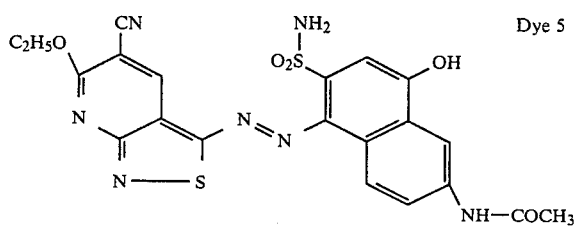 Dye 3*

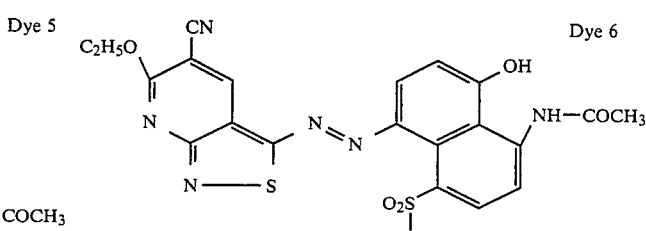 Dye 4*

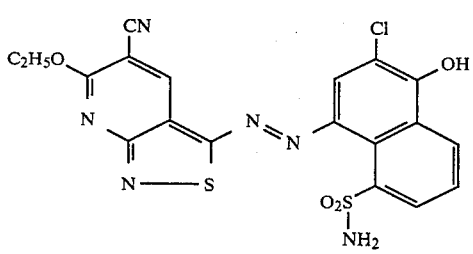 Dye 5

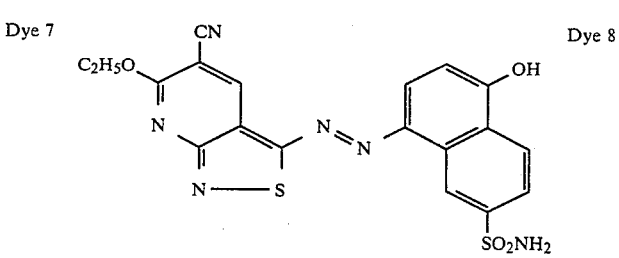 Dye 6

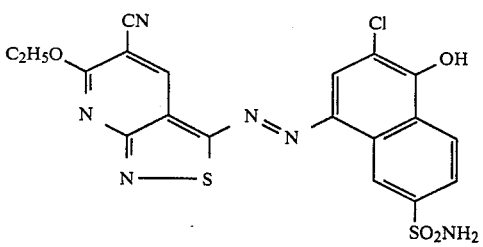 Dye 7

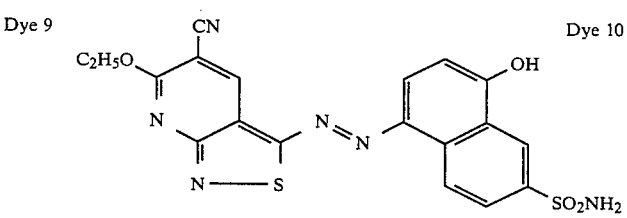 Dye 8

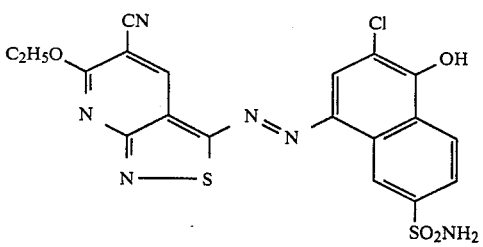 Dye 9

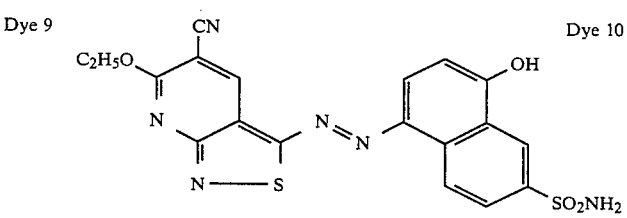 Dye 10

-continued
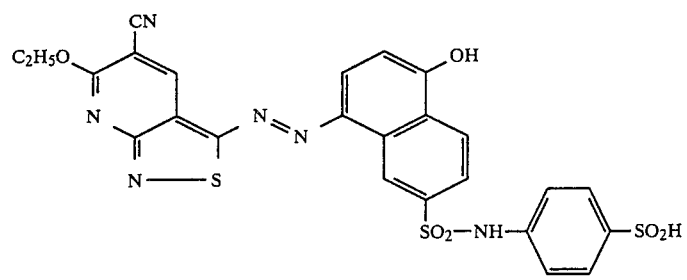
Dye 11
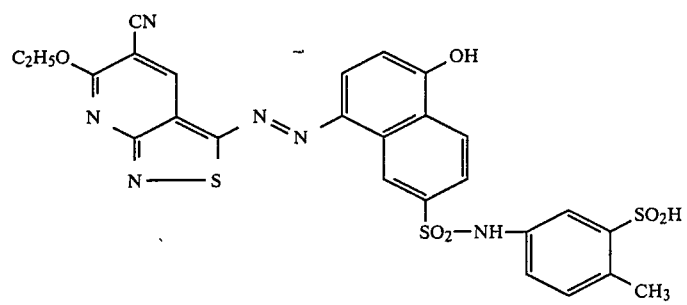
Dye 12
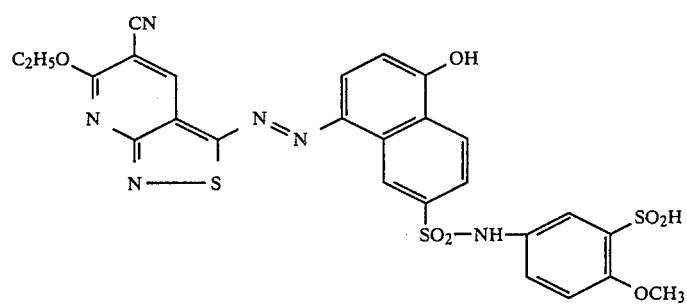
Dye 13
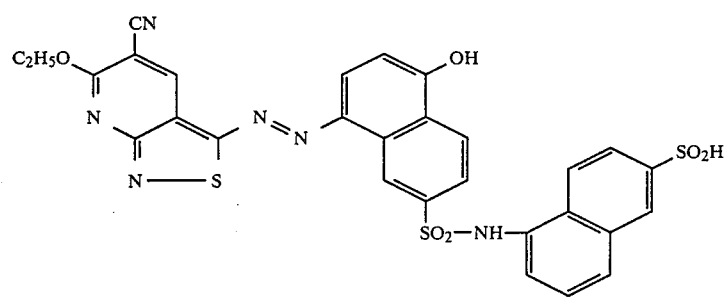
Dye 14
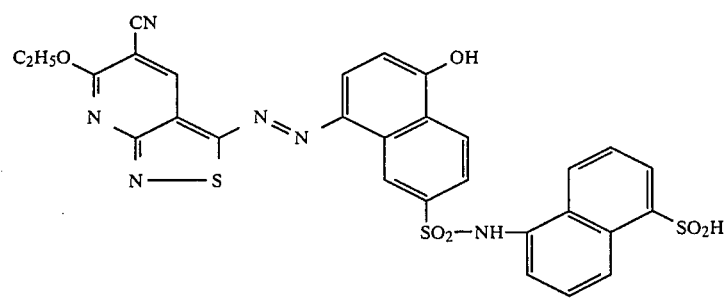
Dye 15

-continued
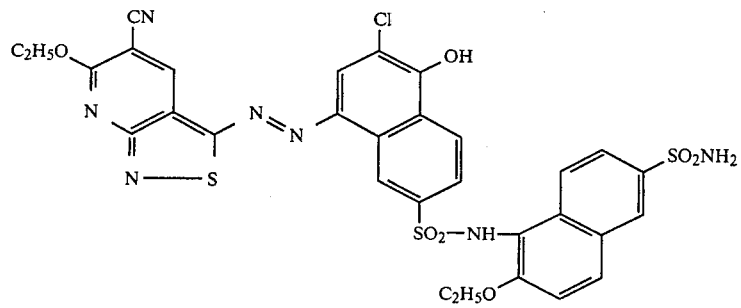
Dye 16
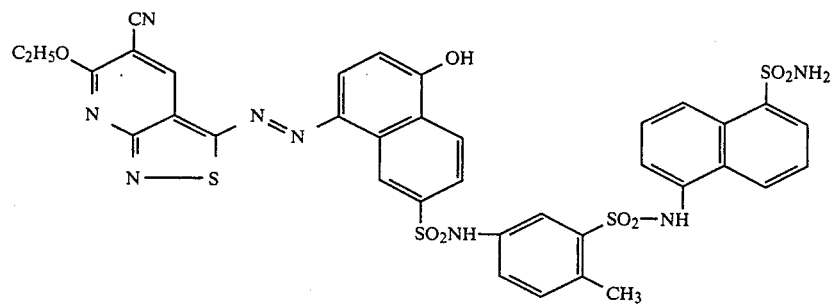
Dye 17
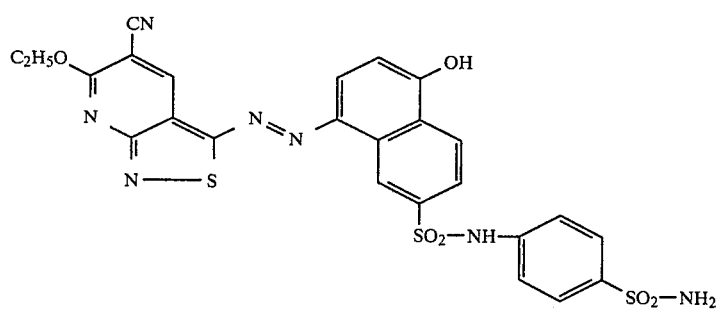
Dye 18
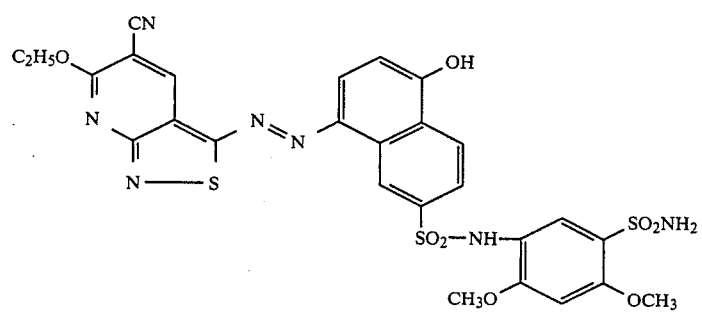
Dye 19
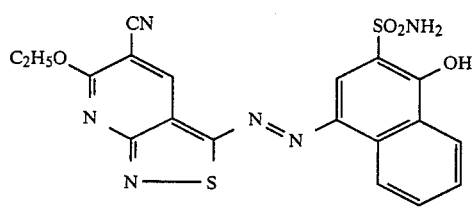
Dye 20
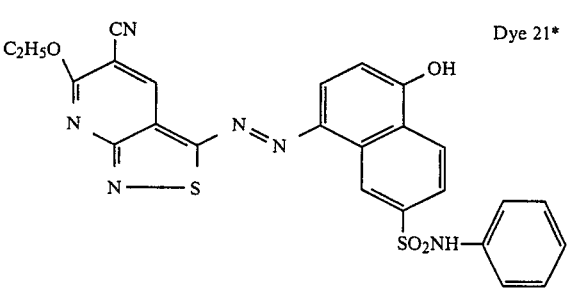
Dye 21*

-continued
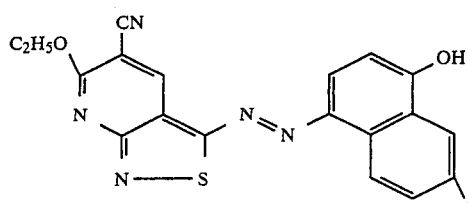
Dye 22
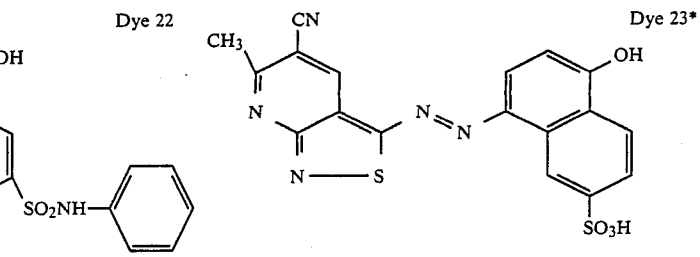
Dye 23*
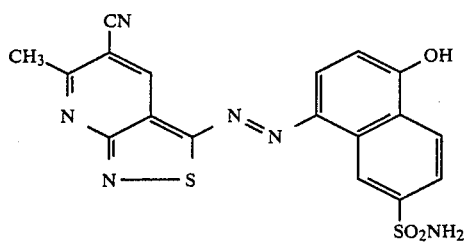
Dye 24
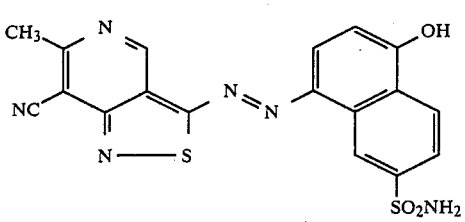
Dye 25
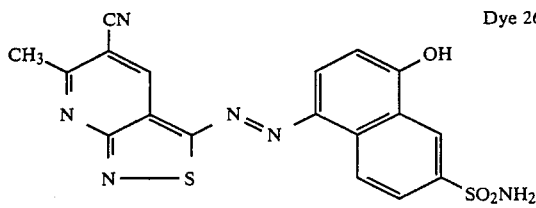
Dye 26
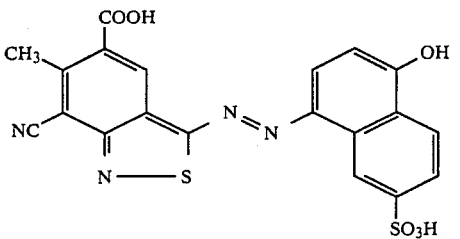
Dye 27*
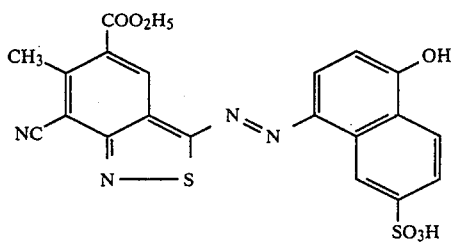
Dye 28*
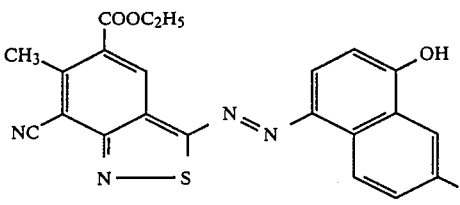
Dye 29*
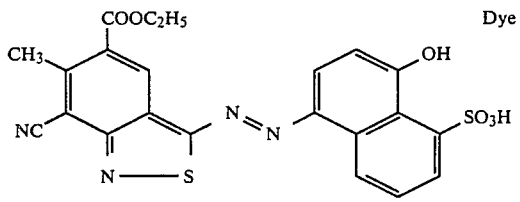
Dye 30*
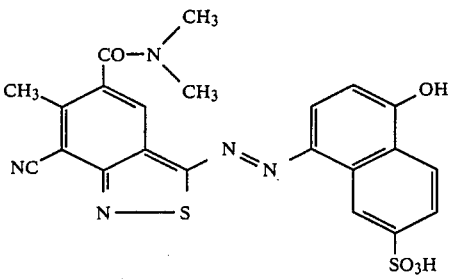
Dye 31*
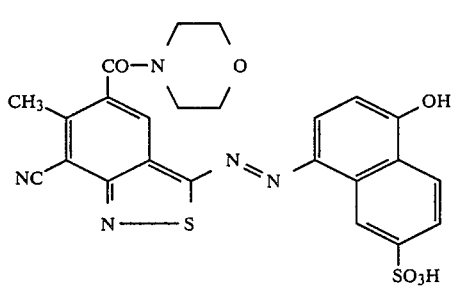
Dye 32*
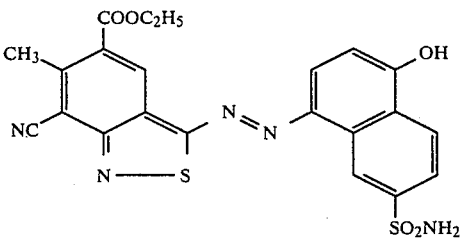
Dye 33

-continued
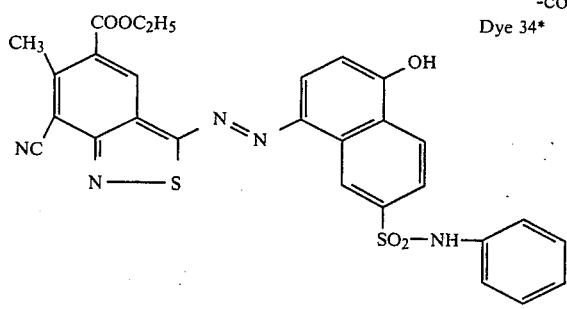
Dye 34*
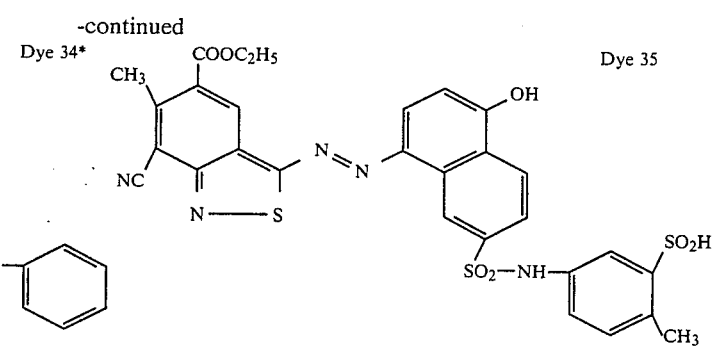
Dye 35
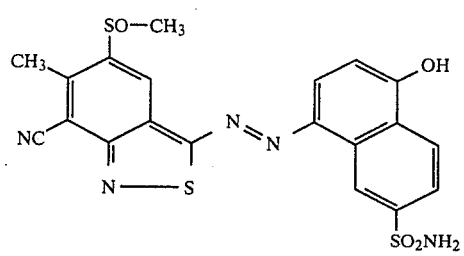
Dye 36
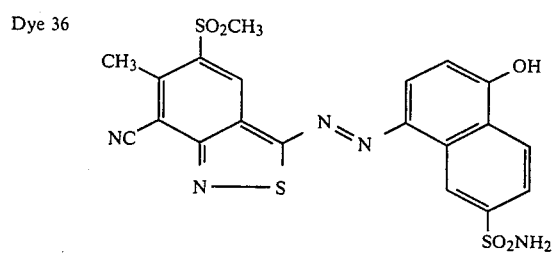
Dye 37
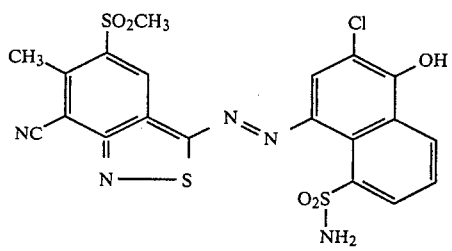
Dye 38
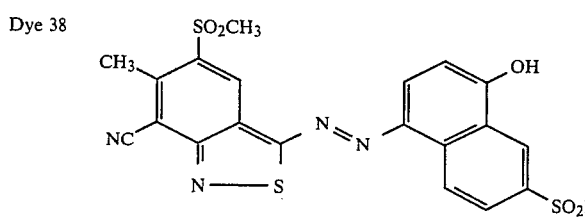
Dye 39
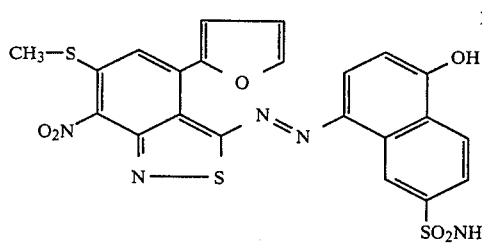
Dye 40
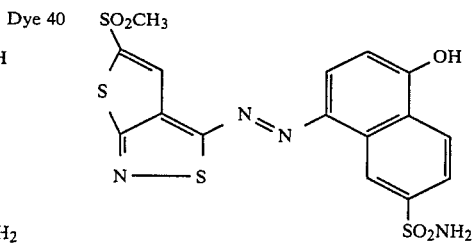
Dye 41
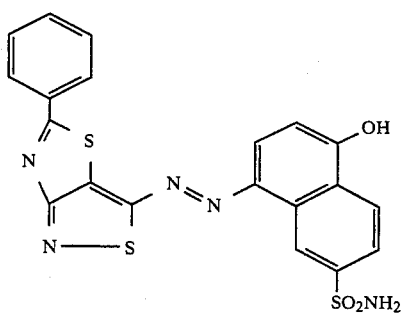
Dye 42
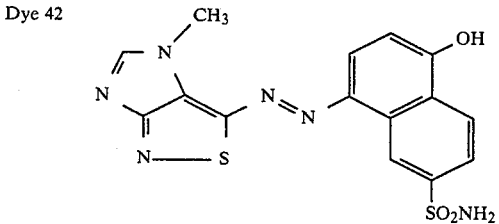
Dye 43
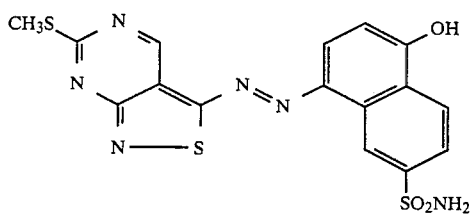
Dye 44
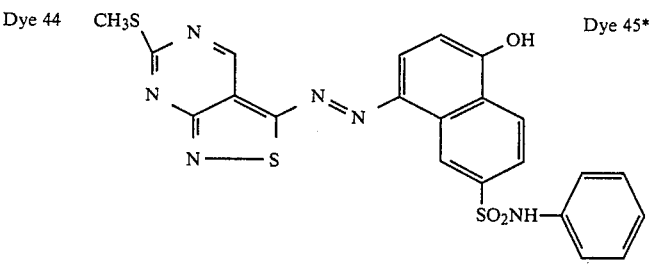
Dye 45*

-continued
Dye 46
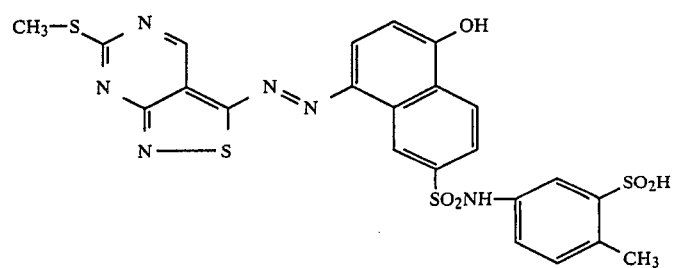
Dye 47
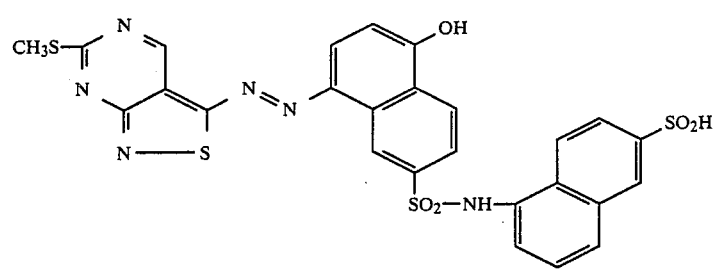
Dye 48 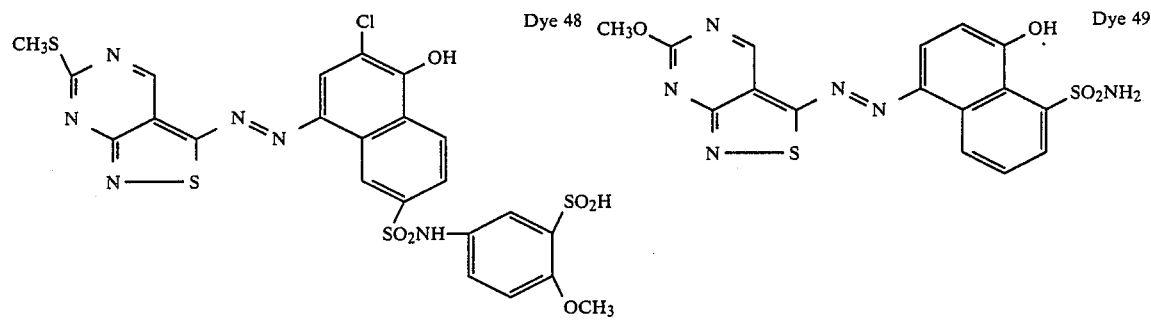 Dye 49
Dye 50 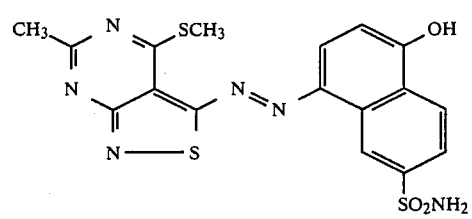 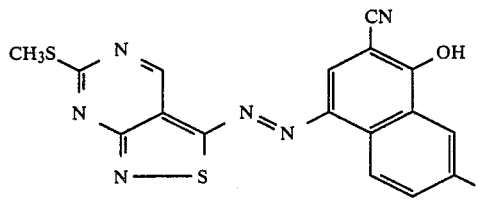 Dye 51
Dye 52*
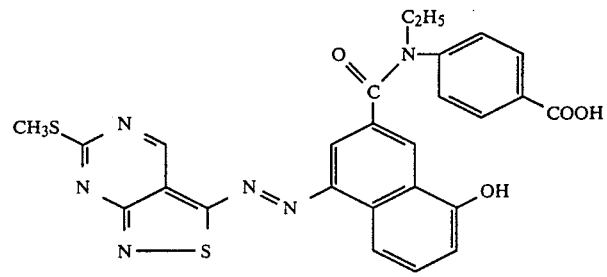
Dye 53
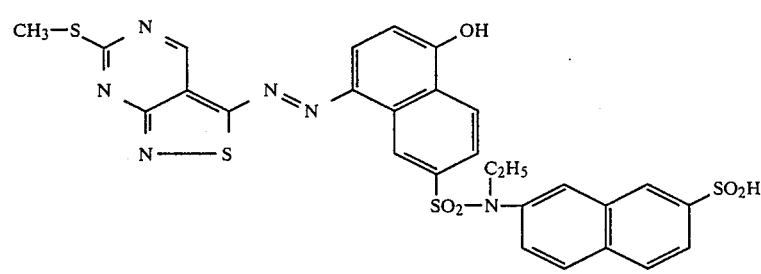

Dye 54

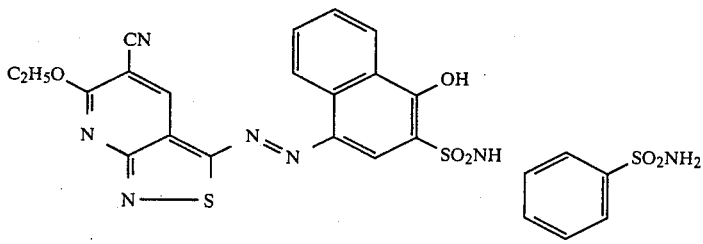

The monoazo dyes of formula I used in accordance with the invention are largely new. This is not surprising because, on account of their pH-behavior, they appear unsuitable for known dyeing purposes. The reason for this is that, at pH-values below 4-5, they are present in the neutral form of which the color is red-violet to blue and only changes to cyan when the pH-value is increased. However, it is precisely this behavior which is required for use in photographic recording materials based on the dye diffusion process, because it has the effect that, in the form in which it is incorporated, the dye does not show strong absorption in the region of the sensitized sensitivity of an associated emulsion layer and, hence, has only a very slight, undesirable filter effect.

The production of the monoazo dyes of formula I according to the invention and of the dye releasers corresponding to formula II normally involves several steps, of which one concerns attachment to the diffusion-preventing carrier radical and another the synthesis of the chromophore. This latter step is normally carried out by azo coupling of the diazonium salt of a condensed aminoisothiazole corresponding to formula II with a naphthol corresponding to formula IV

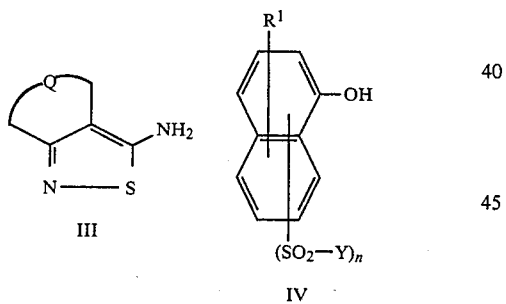

In formulae III and IV, Q, $R^1$, Y and n are as already defined. Y may optionally be present in functionally modified form, i.e. in a form from which the radical Y may be prepared in its definitive form by known preparative techniques.

The process is generally known from the literature and does not require further explanation so far as the expert is concerned. Suitable processes for the diazotization of compounds corresponding to formula III and for azo coupling are described, for example, in the following German Patent Applications: Nos. DE-A- 23 54 686, DE-A- 23 36 978, DE-A- 27 01 289, DE-A- 21 15 626 and DE-A- 27 16 033 (naphtholic azo couplers). A synopsis can be found in the Article by Weaver and Shuttleworth entitled "Heterocyclic Diazo Components" in Dyes and Pigments 3 [1982], pages 81 to 121.

This Article also contains information on the synthesis of the diazo components by the oxidation of an ortho-aminothiocarbonamide which, in turn, can be obtained by the addition of $H_2S$ onto an ortho-aminonitrile. The method was developed by Goerdeler [Chem. Ber. 94, 2950 (1961)] and is now the most widely used process for the synthesis of condensed aminoisothiazoles (III). In addition, useful information on the production by preparative techniques of compounds corresponding to formula III can be found in an Article by Wippel in Mellian Textilber. 50, 1090-1096 (1969) and also in two articles, one by Niess and Eilingsfield in Liebigs. Ann. Chem. 1974, 2019-2029 and the other by Seybold and Eilingsfeld in Liebigs Ann. Chem. 1979, 1271-1279.

The 2-aminothiocarbonamide structure required for the oxidative cyclization may of course also be obtained via the corresponding 2-aminocarboxylic ester and the 2-aminocarbonamide by sulfurization, for example with $P_4S_{10}$.

The following are examples of suitable aminoisothiazoles ("amine") corresponding to formula III:

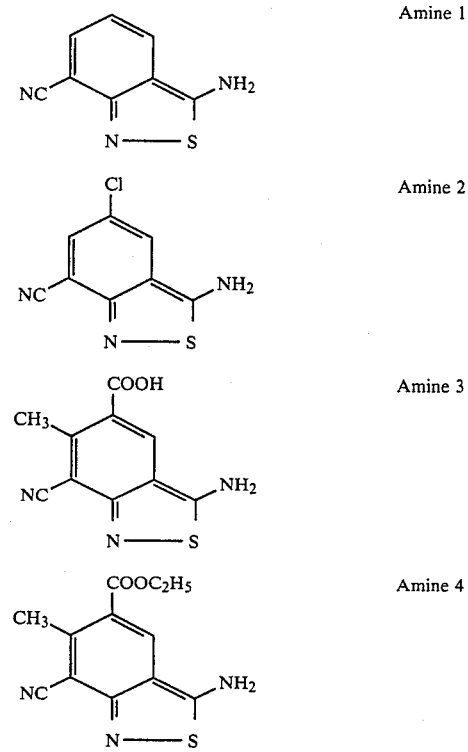

-continued
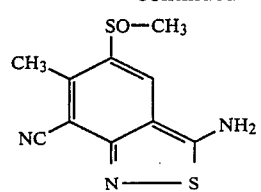
Amine 5
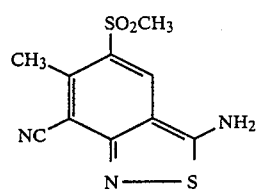
Amine 6
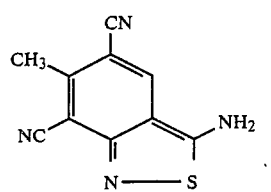
Amine 7
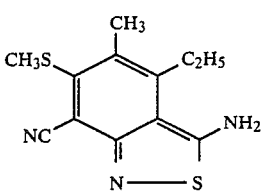
Amine 8
(Note: neither synthesis nor analytical methods provide any reliable indication of whether this compound exists in the structure indicated or in isomeric form with interchanged substituents —SCH₃ and —C₂H₅)
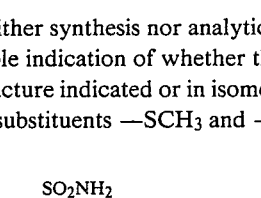
Amine 9
Amine 10
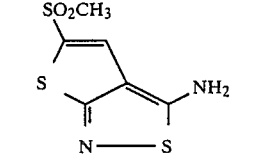
Amine 11
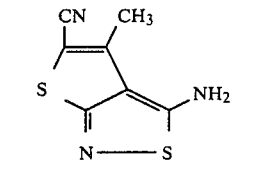
Amine 12
-continued
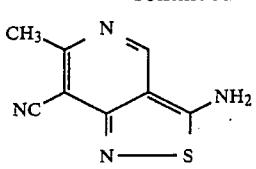
Amine 13
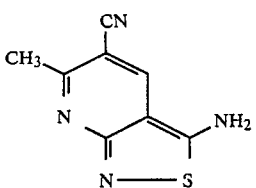
Amine 14
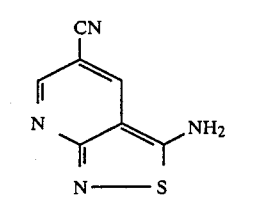
Amine 15
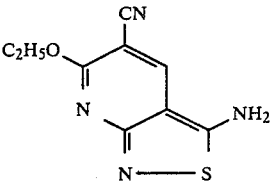
Amine 16
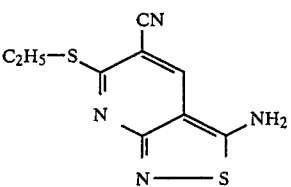
Amine 17
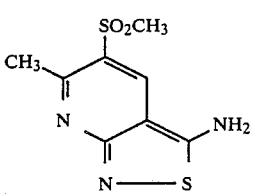
Amine 18
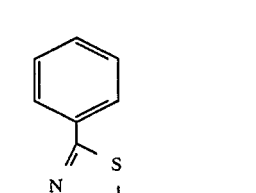
Amine 19
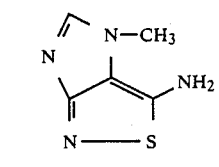
Amine 20

Amine 21
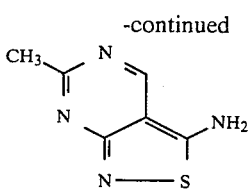

Amine 22
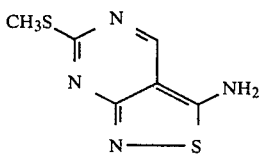

Amine 23
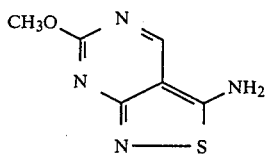

Amine 24
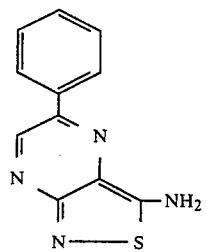

Amine 25
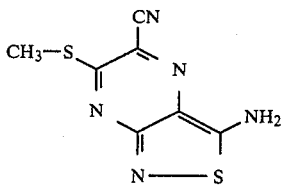

Amine 26
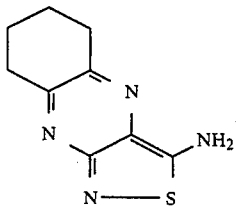

In the selection indicated, compounds 3 to 5 are representative of a number of aminoisothiazoles having a fused benzene ring which are obtained by the process according to German Patent Application No. P 32 20 117.6.

Amines 9 to 11 (aminothienoisothiazoles) are representative of a broader class of aminoisothiazoles having a fused thiophene ring which are obtained from the corresponding aminocyanothiophenes

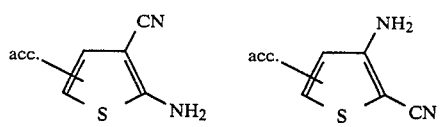

in which acc. represents an electron-accepting group, for example cyano, alkyl sulfonyl, aryl sulfonyl, trifluoromethyl, alkoxycarbonyl, arylaminocarbonyl, aralkylaminocarbonyl, dialkylaminocarbonyl, sulfamoyl, by $H_2S$-addition, followed by oxidation.

Amines 12 to 18 (aminopyridoisothiazoles) are representative of a class of aminoisothiazoles having a fused pyridine ring which are obtained from the corresponding aminocyanopyrimidines containing vicinal amino and cyano groups and corresponding to the following formula

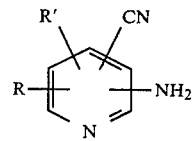

in which R and R' represent further electron donor or acceptor groups, for example alkyl, aryl, alkoxy, aryloxy, alkylthio, arylthio, acylamino, alkoxycarbonyl, sulfamoyl, carbamoyl, sulfone or cyano groups, by $H_2S$-addition, followed by oxidation.

In this connection, reference may be made to the following literature:

Liebscher, Hartmann; J. prakt. Chem. 318 [1979], pages 705–730,

Gewald, Schafer, Bellmann; J. prakt. Chem. 324 [1982] 933–41,

Little, Middleton, Coffman, Engelhardt, Sausen; J. Amer. Chem. Soc. 80, 2832–2838 (1958)

Czerney, Hartmann; J. prakt. Chem. 324, 255–66 (1982), Sayer, Dyes and Pigments 3 [1982] 121–131 and the literature cited therein.

Amines 21 to 23 (aminopyrimidoisothiazoles) are representative of a class of aminoisothiazoles having a fused pyrimidinyl ring which may be obtained from corresponding aminocyanopyrimidines by $H_2S$-addition, followed by oxidation.

Examples of these aminoisothiazoles are:

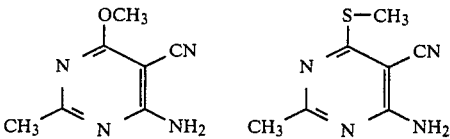

Middleton, Engelhardt, J. Amer. Chem. Soc. 80, 2822–2832 (1958).

Amine 19 (aminothiazoloisothiazoles) is representative of a group of aminoisothiazoles having a fused thiazole ring which may be obtained from the corresponding 4-amino-5-cyanothiazoles by $H_2S$-addition, followed by oxidation. The 4-amino-5-cyanothiazoles used as starting material may be substituted in the 2-position by alkyl, a carbocyclic or heterocyclic, aromatic radical, for example phenyl or thienyl, or by alkoxy, alkylthio, dialkylamino, acylamino or a cyclic amino group.

In this connection, reference may be made to the following literature:

K. Gewald, Blauschmidt, Mayer;
  J. prakt, Chem. [4] 35, page 97 (1967)
  Wobig; Liebigs Ann. Chem. 764 [1972] 125
    1976, 1166
    1978, 1118
    1979, 757
Walek, Pallas, Augustin Tetrahedron 32, 623 [1976]
Hartke, Seib. Arch. Pharm. 303 [1970], 625.

Amine 20 (aminoimidazoisothiazole) is representative of a group of aminioisothiazoles having a fused imidazole ring which may be obtained from the corresponding 4-amino-5-cyanoimidazoles or 5-amino-4-cyanoimidazoles by $H_2S$-addition, followed by oxidation.

In this connection, reference may be made to the following literature:

Dissertation F. Saygin, Munich 1968

Gewald, Heinhold; Monatsh. 107, 1413 et seq.

Amines 24 to 26 (aminopyrazinoisothiazoles) are representative of a group of aminoisothiazoles having a fused pyrazine ring which may be obtained by oxidation from the corresponding 2-aminopyrazine-3-thioamides. The parent 2-amino-3-cyano-pyrazines are known.

In this connection, reference may be made for example to the following literature:

DE-A- 22 48 660

Lang, Fleury, Tetrahedron Lett. 45, 3967–70 (1979)

Taylor, Kobayashi, J. Org. Chem. 38, 2817–2821 (1973)

Schoeni, Fleury, Tetrahedron 31, 671–678 (1975)

Fleury, et al., Bull Soc. Chim. 1971, 2711–16.

The naphthols corresponding to formula IV are based on known coupling components from the chemistry of 1-naphthols which are converted by suitable reactions, for example via the sulfochlorides or acid chlorides, and also by halogenation and/or Bucherer reactions, into the actual coupling components.

Examples of suitable starting materials for these syntheses are 1-naphthol-2-sulfonic acid, 1-naphthol-3-sulfonic acid, 1-naphthol-5-sulfonic acid, 1-naphthol-6-sulfonic acid, 1-naphthylamine-6-sulfonic acid, from which 1-chloro-1-naphthol-6-sulfonic acid may be obtained by chlorination in the course of a Bucherer synthesis, 1-naphthol-7-sulfonic acid, 1-naphthol-8-sulfonic acid, 1-naphthol-3,8-disulfonic acid, 7-acetylamino-1-naphthol-3-sulfonic acid, 8-acetylamino-2-chloro-1-naphthol-5-sulfonic acid, 8-acetylamino-1-naphthol-5-sulfonic acid, 8-benzoylamino-1-naphthol-5-sulfonic acid, 8-acetylamino-1-naphthol-2,5-disulfonic acid and 5-acetylamino-1-naphthol-3-sulfonic acid.

Where two sulfo groups are present, either both sulfo groups may be converted together during the synthesis into a disulfochloride which may in turn be converted into sulfonamides having equal or unequal sulfonamide groups or alternatively the reaction may be carried out in stages. Thus, it is possible, for example, to react the 1-naphthol-3,8-disulfonic acid to form the corresponding naphthsultone sulfochloride and then to functionalize first the sulfochloride group and then, in a following step, the reactive sultone group.

Other naphthols which are suitable for use as starting materials in the synthesis of corresponding dyes are:

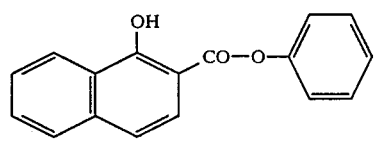

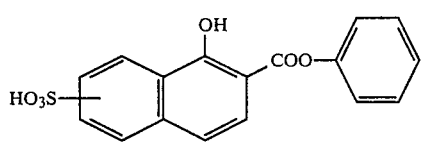

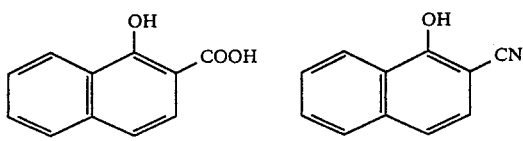

Groups intended for attachment to the diffusion-preventing carrier radical may be introduced by subsequent sulfination or by direct sulfochloride synthesis.

The corresponding reactions are known and do not require any detailed explanation.

Dye releasers of general formula II according to the invention are shown by way of example in the following list:

Dye releaser 1

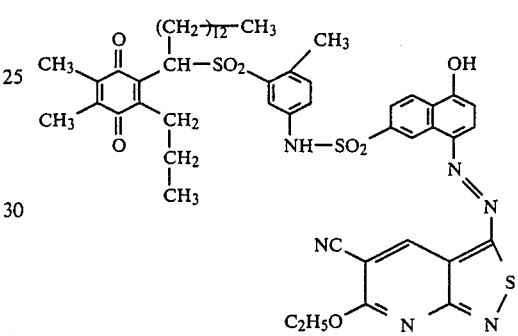

Dye releaser 2

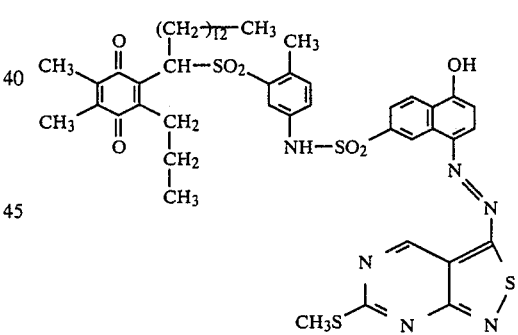

Dye releaser 3

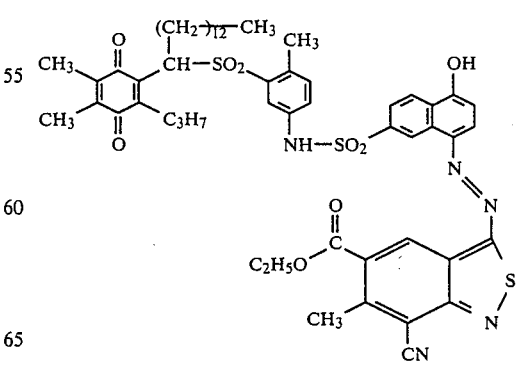

Dye releaser 4

-continued
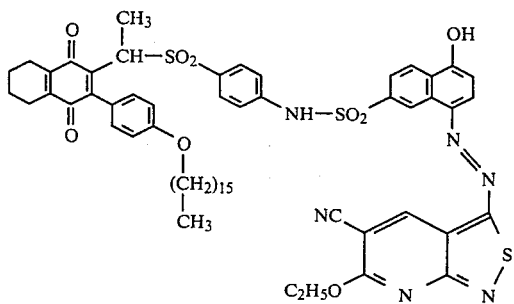
Dye releaser 5
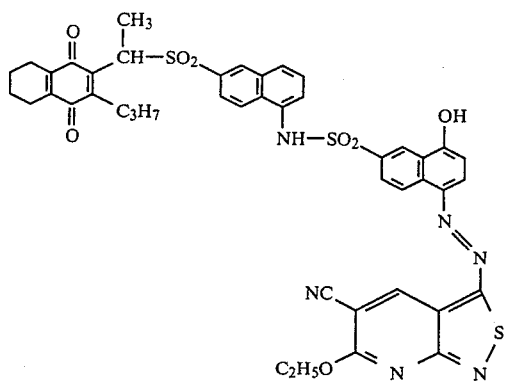
Dye releaser 6
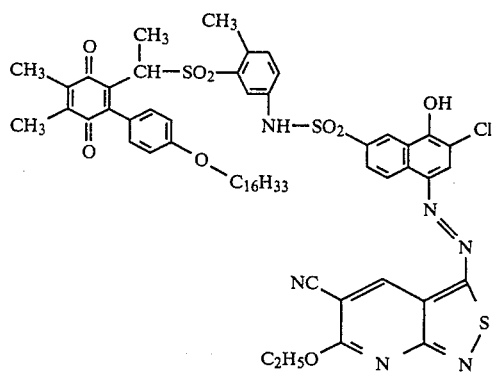
Dye releaser 7
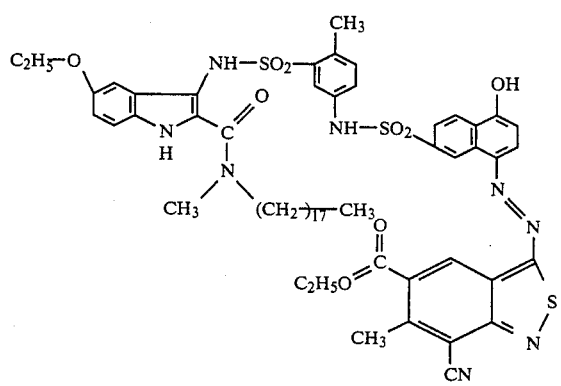
Dye releaser 8
-continued
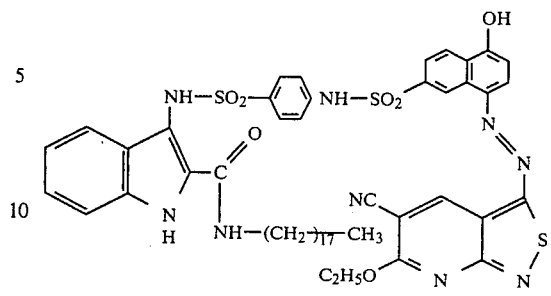
Dye releaser 9
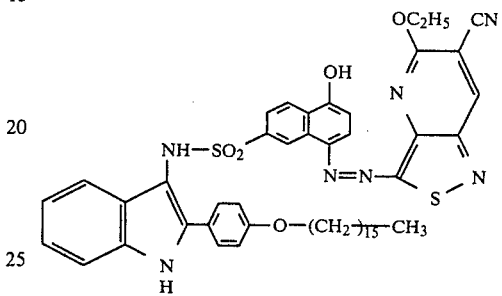
Dye releaser 10
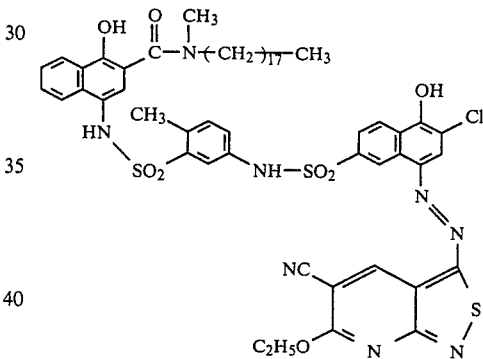
Dye releaser 11
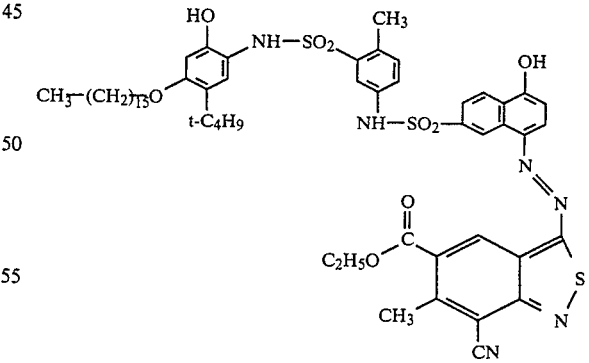
Dye releaser 12
Dye =
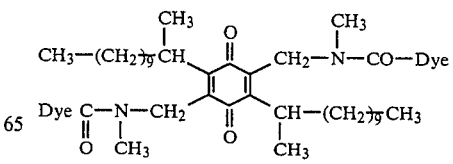

-continued

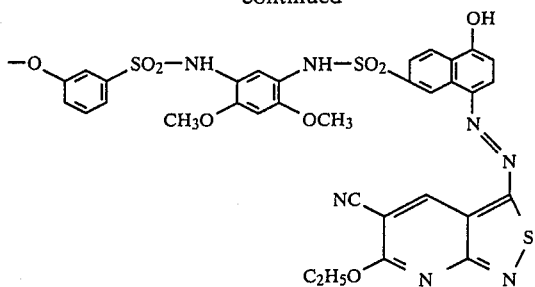

Dye releaser 13

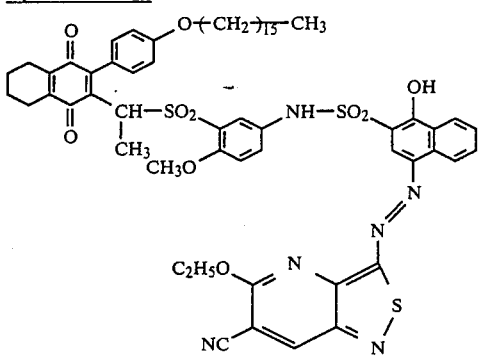

Dye releaser 14

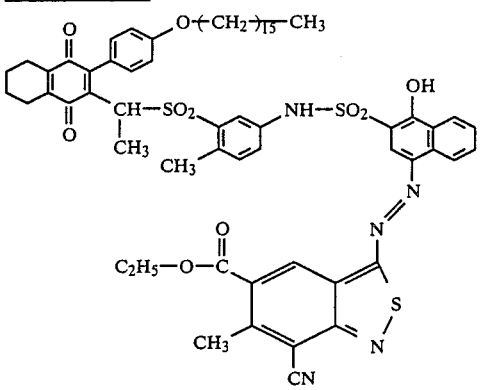

Dye releaser 15

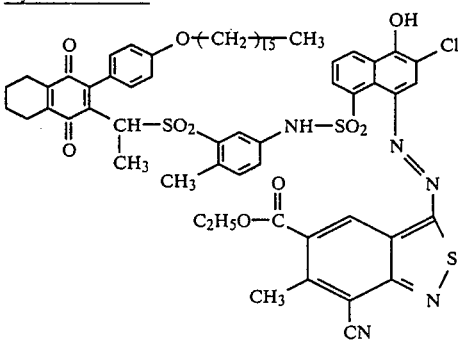

PREPARATION EXAMPLES

DYE 8

The procedure for preparing dye 8 may be used without changing the quantitative ratios or the molar ratios between the diazo component (amine) and coupler (naphthol) for dyes 7, 9, 10, 16, 17, 18, 19, 21, 22, 24, 25, 26, 33, 34, 36, 37, 38, 39, 41, 42, 53, 44, 45, 49, 50.

1.1 g—(5 mMoles) of compound 16 are dissolved at 10° to 15° C. in
10 ml—of orthophosphoric acid, followed by cooling to 0° C., after which
7.5 ml—of propionic acid and
2.5 ml—of acetic acid are added, the mixture is cooled to −10° C. and diazotized at −10° C. to −5° C. with
1 ml—of 40% nitrosyl sulfuric acid. After stirring for 50 minutes,
0.1 g—of urea is added to destroy excess nitrous acid and the diazonium solution is added dropwise at −10° C. to 0° C. to a solution of
1.1 g—(5 mMoles) of 1-naphthol-6-sulfonamide in
20 ml—of methyl glycol. After 2 h, the reaction mixture is poured out onto 150 g of ice water, filtered under suction and stirred with
200 ml—of acetone, followed again by filtration under suction. After digestion with 30 ml of ethyl acetate and filtration under suction, the filter cake gives
0.9 g—of pure dye in the form of a red-brown powder.

Dye releaser 1

Preliminary stage 1: Na-1-acetoxynaphthalene-6-sulfonate
120 g—(0.5 mole) of ammonium-1-naphthol-6-sulfonate and
41 g—(0.5 mole) of Na acetate are boiled under reflux for 2 hours in
600 g—of acetic acid and
600 ml—of acetanhydride. After cooling to 40° C., the reaction mixture is filtered under suction, washed with ethyl acetate and dried. Yield 142 g.

Preliminary Stage 2: 1-acetoxynaphthalene-6-sulfochloride
50 g—of phosphorus pentachloride are introduced at 50° C. into
69 g—of preliminary stage 1, followed by stirring for 1 hour at 60° C. The liquid mixture is introduced into
500 g—of ice, followed by stirring until the evolution of gas is over. The reaction mixture is extracted 3 times with
200 ml—of chloroform, after which the chloroform phase washed until neutral is dried with sodium sulfate and concentrated.

Preliminary Stage 3

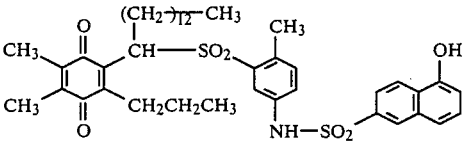

The starting amine (carrier amine) is produced in accordance with DE-A- 31 07 540, pages 45 to 46: 2,3-dimethyl-5-propyl-6-[α-(2-methyl-5-aminophenyl)sulfonyl]-tetradecyl-1,4-benzoquinone.

Starting with
54.3 g—(100 mMoles) of carrier amine in
500 ml—of chloroform, 40 ml of pyridine and 40 ml of pyridine are added, followed by the introduction at 25° C. of a solution of
28.8 g—(115 mMoles) of preliminary stage 2 in 300 ml—of chloroform. After stirring for 2 hours at 20° to 25° C., the reaction mixture is concentrated and the residue stirred with 500 ml of water. After removal of the water under suction, the crystallized residue is taken up in 650 ml of ethanol and the resulting solution refluxed for 1 hour with 100 ml of concentrated hydrochloric acid. After reconcentration, the residue is stirred repeatedly with water, decanted and thoroughly boiled with methanol (300 ml). The product precipitates on cooling. Yield 64 g (88% of the theoretical).

Dye releaser 1

6.6 g—(30 mMoles) of compound 16 in
60 ml—of orthophosphoric acid and
60 ml—of a mixture of propionic acid and acetic acid (3:1) are diazotized at −10° C. with
6 ml—of 40% nitrosyl sulfuric acid in the same way as described for dye 8, after which the diazonium solution freed from excess nitrous acid is introduced at −10° C. to −5° C. into a solution kept at −10° C. of
21.7 g—(30 mMoles) of preliminary stage 3 in a mixture of
200 ml—of propionic acid,
200 ml—of acetic acid and
50 ml—of ethanol. The coupling reaction is completed over a period of 3 hours at −10° C. to 0° C., after which the reaction mixture is poured onto
1000 g—of ice. After stirring for 20 minutes, the product is decanted, washed three times with 200 ml of ice water, as a result of which it solidifies, filtered under suction, dried in air for 24 hours and purified by column chromatography on 1000 g of Woelm silica gel (32–63 μm) using dichloromethane/methanol (98:2) as eluant. After concentration by evaporation, the eluate gives
12.4 g—of chromatographically pure substance in the form of a dark-red powder.

Dye releasers 2 to 6 are also obtained by the same process.

In the dye diffusion transfer process, the dye releasers according to the invention are incorporated in association with a photosensitive silver halide emulsion layer in a color photographic recording material. In the monochromatic process, a recording material such as this contains at least one and, in processes for producing multicolor images, generally at least 3 photosensitive silver halide emulsion layers, in the latter case with different spectral sensitivity, a dye releaser corresponding to formula II being associated with at least one of these layers in accordance with the present invention. On development, the dye releasers according to the invention give diffusible cyan dyes having outstanding light stability, improved spectral properties and reduced sensitivity to reducing agents. Accordingly, they are preferably associated with a red-sensitive silver halide emulsion layer.

In the context of the invention, the expressions "association" and "associated" mean that the mutual arrangement of the photosensitive silver halide emulsion layer and the dye releaser is such that an interaction between them is possible during development, allowing the diffusible azo dye to be released as a function of the development of the silver halide emulsion layer. To this end, the photosensitive silver halide and the dye releaser do not necessarily have to be present in the same layer; they may even be accommodated in adjacent layers each belonging to the same layer unit.

If the dye releasers according to the invention are reducible reductively splitable compounds which are best used in conjunction with ED-compounds (or their precursors, for example in accordance with No. DE-A- 30 06 268), the expression "association" is to be understood to mean that the mutual arrangement of the silver halide emulsion, the ED-compound or ED-precursor compound and the dye releaser is such that an interaction is possible between them, permitting an imagewise consistency between the silver image formed and the consumption of ED-compound on the one hand and between the unused ED-compound and the dye releaser on the other hand, so that an imagewise distribution of diffusible dye is produced in consistency with the undeveloped silver halide.

Although a variety of different methods may be used for incorporating the dye releasers according to the invention, it has proved to be favorable to incorporate the dye releasers according to the invention in the layers in the form of emulgates using so-called oil formers. The advantage of this, particularly where reducible, reductively splitable dye releasers are used in combination with ED-compounds, is that the dye releasers and the ED-compounds may be brought into particularly close functional contact in the form of a common emulgate. Suitable oil formers are described, for example, in U.S. Pat. No. 2,322,027 and in No. DE-A- 17 72 192, No. DE-A- 20 42 659 and No. DE-A- 20 49 689. The optimal quantities of the dye releaser and the ED-compound, if any, to be incorporated may be determined by simple routine tests. The dye releaser according to the invention is used, for example in quantities of from 0.05 to 0.2 mole and the ED-compound, if any, in quantities of from 0.1 to 0.6 mole per mole of silver halide.

The development of the color photographic recording material according to the invention exposed to form an image is initiated by treatment with an aqueous-alkaline, optionally highly viscous developer solution. The auxiliary developer compounds required for development are either present in the developer solution or may even be completely or partly present in one or more layers of the color photographic recording material according to the invention. During development, diffusible dyes are released imagewise from the dye releasers and transferred to an image-receiving layer which is either an integral part of the color photographic recording material according to the invention or is in contact therewith at least during the development time. Accordingly, the image-receiving layer may be arranged on the same layer support as the photosensitive element or on a separate layer support. It consists essentially of a binder, the mordant for fixing the diffusible dyes released from the non-diffusing dye releasers. Preferred mordants for anionic dyes are long-chain quaternary ammonium or phosphonium compounds, for example those of the type described in U.S. Pat. No. 3,271,147 and U.S. Pat. No. 3,271,148. It is also possible to use certain metal salts and their hydroxides which form substantially insoluble compounds with the acidic dyes. In addition, mention is also made here of polymeric mordants, for example of the type described in No. DE-A- 23 15 304, No. DE-A- 26 31 521 or No. DE-A- 29 41 818. The dye mordants are dispersed in the mordant layer in one of the usual hydrophilic binders, for example in gelatin, polyvinyl pyrrolidone, completely or partly hydrolyzed cellulose esters. Certain binders may of course also function as mordants, for example polymers of nitrogen-containing, optionally quaternary bases, for example of N-methyl-4-vinylpyridine, 4-vinylpyridine, 1-vinylimidazole, as described for example in U.S. Pat. No. 2,484,430. Other suitable mordant binders are, for example, guanyl hydrozone derivatives of alkyl vinyl ketone polymers, of the type described for example in U.S. Pat. No. 2,882,156, or guanyl hydrazone derivatives of acyl styrene polymers, of the type described for example in No. DE-A- 20 09 498. In general, however, other binders, for example gelatin, will be added to these particular mordant binders.

If the image-receiving layer remains in layer contact with the photosensitive element, even on completion of development, an alkali-permeable pigment-containing light-reflecting binder layer is generally situated between them, establishing the optical separation between negative and positive and serving as an aesthetically attractive image background for the transferred dye image. A light-reflecting layer such as this may already be preformed in known manner in the photosensitive color photographic recording material or, again in known manner, need only be formed during development. If the image-receiving layer is arranged between the layer support and the photosensitive element and is separated from the latter by a preformed light-reflecting layer, either the layer support has to be transparent, so that the dye transfer image produced can be viewed through it, or alternatively, the photosensitive element has to be removed together with the light-reflecting layer from the image-receiving layer in order to expose the latter. However, the image-receiving layer may also be present as the uppermost layer in an integral color photographic recording material, in which case the recording material is best exposed through the transparent layer support.

After processing, the image-receiving layer contains an imagewise distribution of cyan monoazo dyes corresponding to formula I. After processing, the Dye releaser of formula II associated with the originally photosensitive silver halide emulsion layer is also present in imagewise distribution complementarily to the transferred dye image and may also be utilized as a dye image (retained image).

In cases where they are used in a color negative film intended for the production of images on paper by the negative process, it is of benefit to the dyes according to the invention that their long-wave absorption band is largely consistent with that of chromogenically produced cyan dyes of naphtholic couplers of the type predominantly used in negative films.

EXAMPLE 1

Image-receiving sheet 1

The following layers were applied to a paper support coated on both sides with polyethylene and provided with an adhesive layer. The figures are based on 1 m².
1. A mordant layer containing 6 g of mordant A and 5 g of gelatin.
2. A hardening layer containing 0.1 g of gelatin and 0.15 g of hardener H.

Strips of the image-receiving material obtained were immersed in a 0.025-molar dye solution alkalized with 2% of sodium hydroxide and dyed to a density of 1.2-1.5 (as measured behind red filters using a Macbeth RD 514 reflection densitometer).

The following dyes were used: Dyes 1-4, 7-10, 21, 22, 23, 24, 28-30, 33, 34, 44, 45 (according to the invention) and, for comparison, prior art dye B.

After the immersion treatment, the samples are rinsed with demineralized water and dried.

The results of the spectral measurements are set out in Table 1 below, the following symbols being used for assessment of the visual color impression:
bcn = color impression too blue
cn = color impression correct
gcn = cyan with visible tinges of green
vc = very clear
c = clear
cl = clouded It can be seen from the data that the dyes according to the invention are superior overall in their spectral data to the comparable prior art dye.

In particular, the secondary densities behind green filter, as measured with a Macbeth RD-514 reflection densitometer, are clearly lower than those of dye B. Through the elimination of the magenta component, the overall effect of the dyes is greener.

The percentage change in color density on exposure to a xenon light $4.8 \times 10^6$ lx.h is shown in the last column.

In the penultimate column, values above 700 nm are not shown in some cases on account of uncertainty regarding the apparatus used.

TABLE 1

| Dye | Color impression | Secondary densities behind blue filter [%] | Secondary densities behind green filter [%] | $\lambda_{max}$ [nm] | Half band-width [nm]* | $\frac{\Delta D}{D_o}$ |
|---|---|---|---|---|---|---|
| B | cn | 17 | 30 | 640 | 545-685 | -91% |
| 1 | gcn c | | | 670 | 590-740 | |
| 2 | gcn c | | | | | |
| 3 | gcn c | | | 655 | 577-725 | |
| 4 | bcn | | | 640 | 565-605 | |
| 7 | cn c | | | | | |
| 8 | gcn vc | 17 | 23 | 655 | 576- | -85% |
| 9 | cn vc | | | | | |
| 10 | gcn vc | | | | | |
| 21 | cn vc | | | | | |
| 22 | gcn vc | 20 | 25 | 670 | 577- | -87% |
| 23 | gcn | | | 688 | 591- | -79% |
| 24 | cn | 23 | 32 | 690 | 570- | -61% |
| 28 | gcn c | 23 | 27 | 690 | 575- | -75% |
| 29 | gcn c | | | | | |
| 30 | gcn c | | | | | |
| 33 | gcn vc | 20 | 27 | 700 | 573- | -67% |
| 34 | gcn vc | | | | | |
| 44 | cn vc | 18 | 25 | 650 | 570- | -80% |
| 45 | gcn vc | 19 | 23 | 655 | 572- | -91% |

EXAMPLE 2

The procedure is as in Example 1 using Image-receiving sheet 2:
1. A mordant layer containing
   4 g of a polyvinyl imidazole of which 10 mole percent has been quaternized with chloroethanol (cf. Research Disclosure No. 22 040),
   5 g of gelatin and
   0.02 g of saponin.
2. Same hardener layer as in Example 1.

The following dyes were used:
Dye B (prior art)
Dyes 1,3,4,8,21,22,23,24,28,30,33,44,45 (according to the invention).

Testing was carried out by the method described in Example 1.

TABLE 2

| Dye | Color impression | Secondary densities behind blue filter [%] | Secondary densities behind green filter [%] | $\lambda_{max}$ [nm] | Half band-width [nm] | $\frac{\Delta D}{D_o}$ |
|---|---|---|---|---|---|---|
| B | cn c | 18 | 30 | 645 | 567–688 | −20% |
| 1 | gcn | | | | | |
| 3 | gcn | | | | | |
| 4 | cn | 22 | 30 | 650 | 570– | −19% |
| 8 | gc vc | 19 | 25 | 650 | 575– | −20% |
| 21 | gcn c | | | | | |
| 22 | gcn vc | 22 | 25 | 670 | 590– | −40% |
| 23 | cn c | 24 | 36 | 684 | 586– | −18% |
| 24 | cn c | 21 | 30 | 680 | 572– | −15% |
| 28 | gcn c | 20 | 21 | 680 | 590– | −18% |
| 30 | gcn | 25 | 25 | 690 | 580– | −21% |
| 33 | gcn vc | 23 | 25 | 690 | 580– | −4% |
| 44 | gcn c | 20 | 25 | 655 | 568–724 | −21% |
| 45 | gcn | 21 | 24 | 668 | 570–727 | −11% |
| 12 | gcn | 23 | 26 | 667 nm | | |

(from dye releaser 1)

The results of Example 2 show that, in general, equivalent and, in some cases, more favorable light stability values are obtained on the image-receiving sheet 2, which is more favorable from the outset in its light stability level, when the hetaroisothiazole or benzisothiazole azonaphthols are used instead of conventional cyan dyes (dye B).

EXAMPLE 3

A photosensitive element of a photographic recording material was prepared by successively applying the following layers to a transparent support of polyethylene terephthalate. The quantities indicated are based in each case on 1 m².

Material I (Comparison)

1. A blue-sensitized emulsion layer containing 0.5 g (Ag) of a silver chloride bromide iodide emulsion, 1.4 g of gelatin, 0.3 g of dye releaser C (yellow) and 0.25 g of ED-compound F.
2. An intermediate layer of 0.8 g of Colanyl-Gelb HR Dispergat (a Hoechst product), 0.1 g of ED-compound F and 0.8 g of gelatin.
3. A green-sensitized emulsion layer containing 0.36 g (Ag) of a silver chloride bromide iodide emulsion, 0.92 g of gelatin, 0.18 g of dye releaser D (magenta) and 0.14 g of ED-compound F.
4. An intermediate layer of 0.6 g of developer compound G, 0.1 g of ED-compound F and 1.36 g of gelatin.
5. A red-sensitized emulsion layer containing 0.33 g (Ag) of a silver chloride bromide iodide emulsion, 1.0 g of gelatin, 0.2 g of dye releaser E (cyan) and 0.11 g of ED-compound F.
6. An intermediate layer of 0.05 g of developer compound G and 0.39 g of gelatin.
7. A white pigment layer of 16.0 g of $TiO_2$ and 2.3 g of gelatin.
8. An intermediate layer of 0.2 g of diisooctyl hydroquinone and 4.0 g of gelatin. p1 9. A mordant layer containing 4.5 g of a polyvinyl imidazole, of which 20 mole percent has been quaternized with chloroethanol, and 5.2 g of gelatin.
10. A hardener layer containing 1.2 g of hardener H and 0.6 g of gelatin.

Materials according to the invention were produced in the same way, differing from material I in the fact that, instead of dye releaser E, the red-sensitized emulsion layer (layer 5) contained a dye releaser according to the invention, namely:

Material II—0.23 g of dye releaser 1
Material III—0.23 g of dye releaser 2
Material IV—0.33 g of dye releaser 3
Material V—0.27 g of dye releaser 13

The following activator was used for development:
potassium hydroxide—40 g
potassium bromide—3 g
2,2-methylpropyl-1,3-propane diol—25 g
1,4-cyclohexane dimethanol (50%)—20 g
water—912 g The materials were exposed behind a grey wedge and then developed for 2 minutes in the activator indicated, rinsed for 5 minutes and dried. The Dmin- and Dmax-values, the light stability (Xenotester-$7.2 \times 10^6$ lx.h) and the dark fading (100 h storage at 35° C./90% relative humidity) of the processed materials were determined by measurement behind red filters (Table 3).

TABLE 3

| Material | $D_{max}$ | $D_{min}$ | Light stability $\frac{\Delta D}{D_o}$ ($7.2 \times 10^6$ lx.h) at $d = 0.6$ | at $D = 1.2$ | $\lambda_{max}$ | Dark fading $\frac{\Delta D}{D_o}$ (100 h; 35° C./90% rel humidity) |
|---|---|---|---|---|---|---|
| I | 2.09 | 0.15 | −18% | −19% | 640 | −21% |
| II | 1.68 | 0.17 | −10% | −10% | 667 | −0.6% |
| III | 2.17 | 0.19 | −4% | −7% | 654 | −3.8% |
| IV | 2.10 | 0.12 | −14% | −11% | 670 | +7.7% |
| V | 1.21 | 0.15 | −12% | −4% | 650 | +9.7% |

It can be seen from Table 3 that, where the dye releasers according to the invention are used, light stability is improved and dark fading in a tropical cabinet is completely avoided. In addition, it is noticeable in the testing of filter exposures behind blue, green and red filters that, where dyes according to the invention are used, the reproduction of green areas is distinctly improved without any clouding of the blue area.

Formula appendix

Mordant A

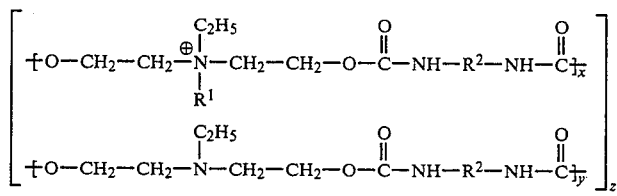

-continued
Formula appendix
z  50% $C_2H_5-O-SO_3^\ominus$
   50% $Cl^\ominus$
x  90%
y  10%
$R^1$ 50% $-C_2H_5$
50% 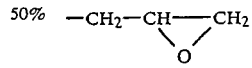
$R^2$ 70%, 30% 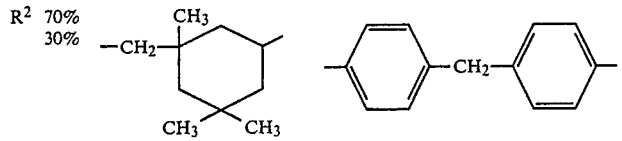
Dye B
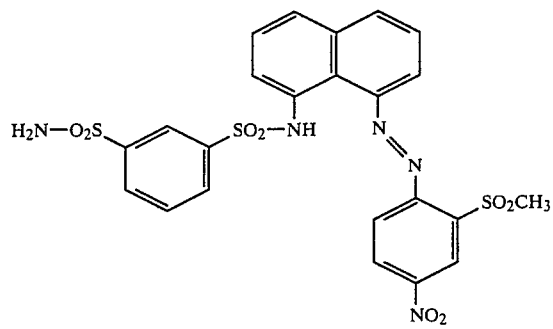
Dye releaser C (yellow)
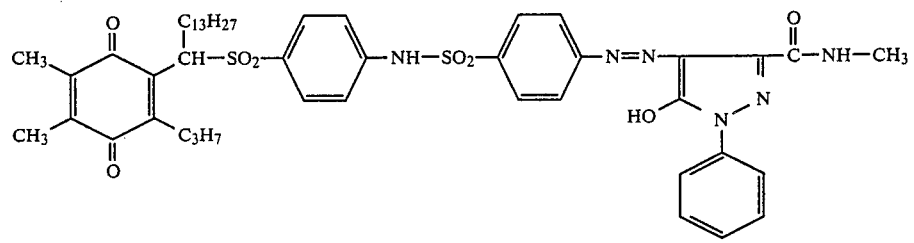
Dye releaser D (magenta)
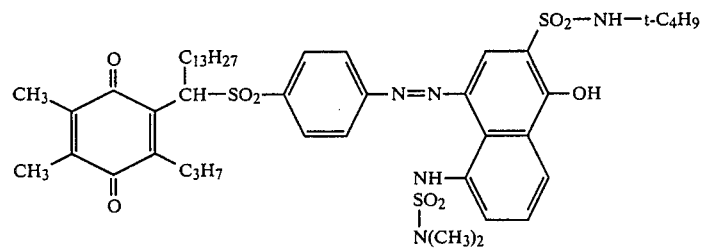
Dye releaser E (cyan)
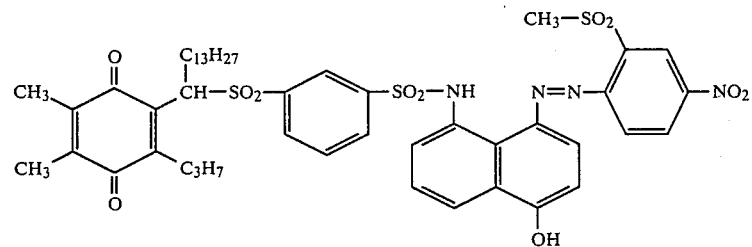

-continued
Formula appendix

ED-compound F

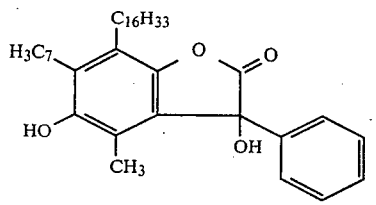

Developer compound G

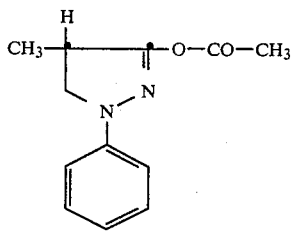

Hardener H

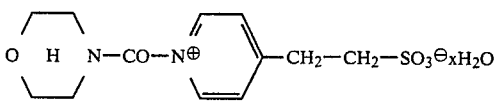

We claim:

1. A color photographic recording material for the production of colored images by the dye diffusion transfer process which contains, in association with at least one photosensitive silver halide emulsion layer, a non-diffusing color-providing compound, from which a diffusible azo dye is released under the alkaline development conditions as a function of the development of the silver halide emulsion layer, wherein the improvement comprises the azo dye corresponds to the following formula I

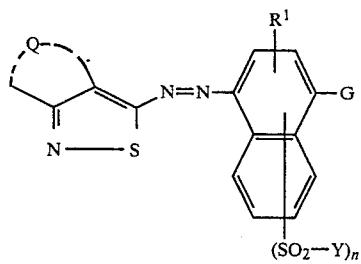

in which
Q represents the remainder of the molecule required to complete a fused benzene or thiophene radical, which contains additional electron acceptor groups, or to complete a fused pyridine, pyrimidine, pyridazine, pyrazine or thiazole ring;
G represents —OH;
$R^1$ represents H or one or two identical or different radicals selected from the group consisting of halogen, acyl, acylamino and —CN;
Y represents H, —OH, an amino group optionally substituted by alkyl or aryl, a cyclic amino group or a group corresponding to the formula —NH—SO$_2$—R$^2$;
$R^2$ represents alkyl, aryl, an amino group optionally substituted twice by alkyl or a cyclic amino group; n=0, 1 or 2.

2. In the method of producing a light-stable cyan image by dye diffusion processing of an imagewise-exposed color photographic recording material containing associated with at least one light-sensitive silver halide emulsion layer, a non-diffusible color providing compound while in contact with a supported image receptor layer, the method comprising the step of releasing from said non-diffusible color providing compound under alkaline development conditions a diffusible azo dye corresponding to the following formula

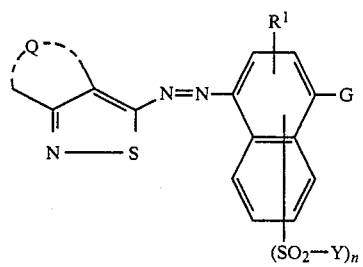

in which
Q represents the remainder of the molecule required to complete a fused benzene or thiophene radical, which contains additional electron acceptor groups, or to complete a fused pyridine, pyrimidine, pyridazine, pyrazine or thiazole ring;
G represents —OH;

$R^1$ represents H or one or two identical or different radicals selected from the group consisting of halogen, acyl, acylamino and —CN;

Y represents H, —OH, an amino group optionally substituted by alkyl or aryl, a cyclic amino group or a group corresponding to the formula —NH—SO$_2$—R$^2$;

$R^2$ represents alkyl, aryl, an amino group optionally substituted twice by alkyl or a cyclic amino group; n=0, 1 or 2.

* * * * *